Jan. 16, 1951

A. M. HUTCHINSON 2,538,458

ATTACHMENT FOR TELEPHONES

Filed Nov. 9, 1948

Inventor

Alice M. Hutchinson

By Clarence A. O'Brien and Harvey B. Jacobson

Attorneys

UNITED STATES PATENT OFFICE 2,538,458

ATTACHMENT FOR TELEPHONES

Alice M. Hutchinson, Akron, Ohio

Application November 9, 1948, Serial No. 59,044

8 Claims. (Cl. 179—156)

This invention relates to new and useful improvements in telephone supports and the primary object of the present invention is to provide a novel and improved head harness and support therefor that is quickly and readily applied to the ear piece of a telephone to retain the same relative to a user's ear and mouth in such a manner as to leave the user's hands free for typing telephone dictation or under other such conditions, at home or in the office, when it becomes desirable or necessary that the user's hands be unoccupied.

Another important object of the present invention is to provide an attachment for telephones including a pivotal harness support normally overlying the handle of a telephone, between the ear piece and mouth piece, and means for locking the support in an extended position with the head harness projecting from the ear piece.

A further object of the present invention is to provide a device for supporting the ear piece and mouth piece of a telephone relative to a user's head that is extremely small and compact in structure and which is applied to the ear piece without in any way harming the normal structure of the telephone.

A still further aim of the present invention is to provide an attachment for telephones that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figures 1, 2, 5:
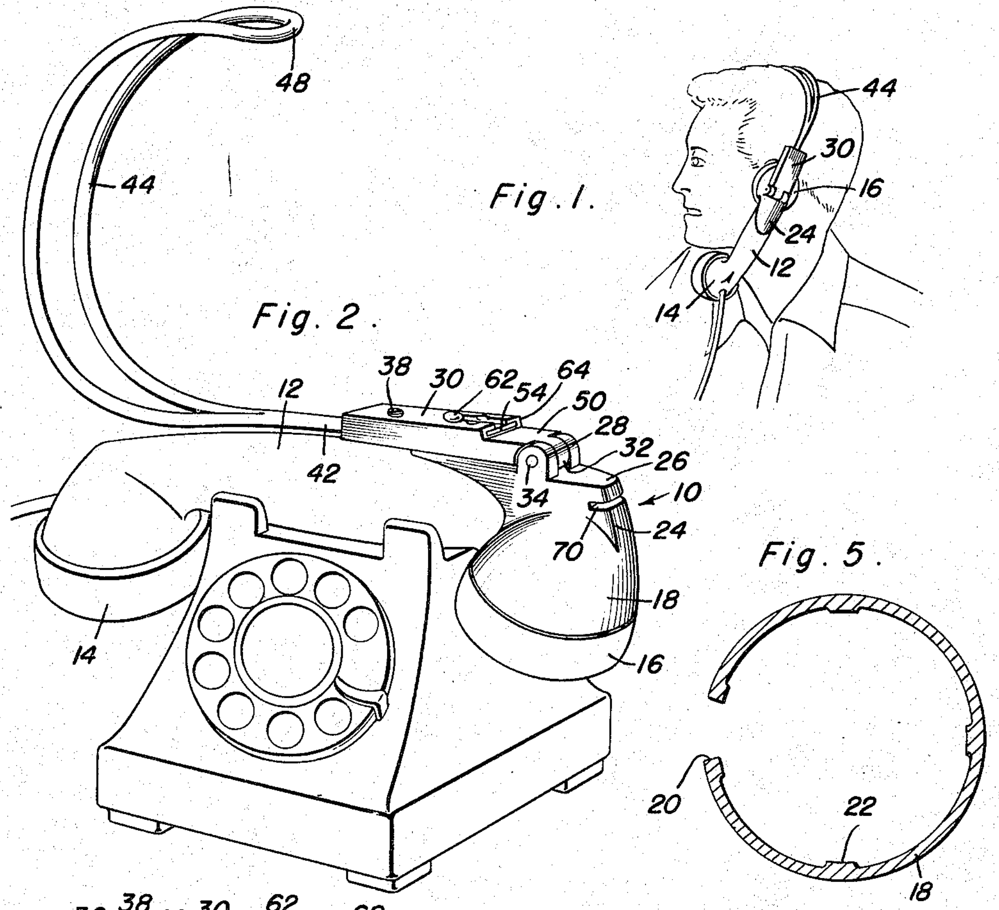
Figure 1 is a perspective view showing the present invention applied to a telephone and in use.
Figure 2 is a perspective view of a telephone and showing the present invention applied thereto in an unused position.
Figures 3, 4:
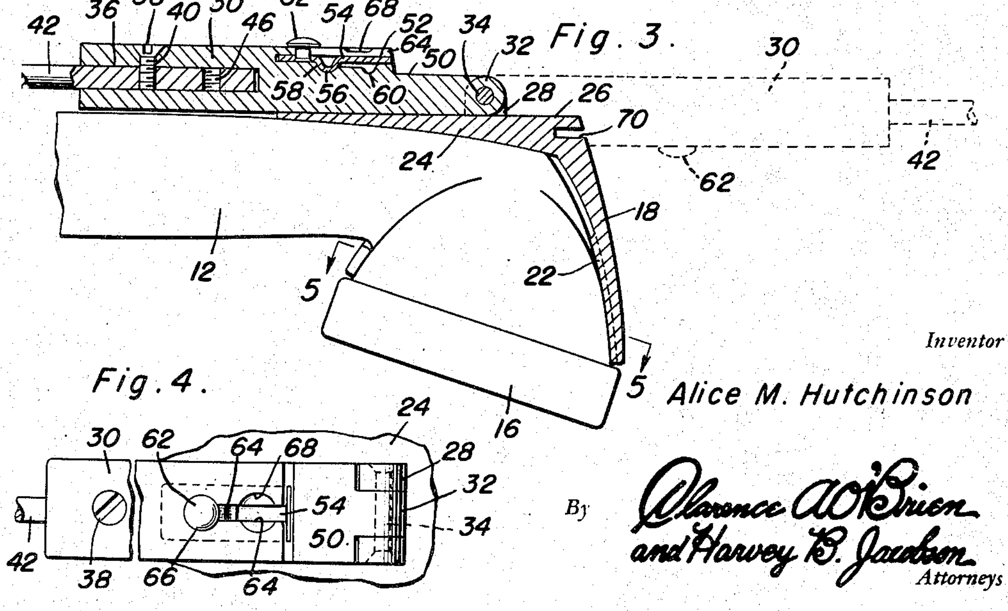
Figure 3 is a fragmentary side elevational view of a telephone and showing the present invention applied thereto, with parts of the present invention broken away and shown in section, and with dotted lines showing the extended position for the present invention.
Figure 4 is a fragmentary top plan view of Figure 2 showing the locking member and support; and, Figure 5 is a sectional view of the anchoring member used in conjunction with the present invention taken substantially on the plane of section line 5—5 of Figure 3.

Referring now to the drawings in detail, wherein for the purpose of illustration, there is disclosed a preferred embodiment of the present invention, the numeral 10 represents a telephone generally, including a hand grip or hand piece 12 having a mouth-piece 14 at one end and an ear-piece 16 at its remaining end.

Yieldingly embracing the ear-piece 16 is a substantially conical member 18 of resilient material having a longitudinal slot or split 20 that facilitates the same to be quickly and readily applied to the ear-piece in a convenient manner.

The inner periphery of the conical member 18 is provided with a plurality of gripping lugs or ribs 22 that bear against the outer surface of the ear-piece to prevent turning of the member 18 relative to the ear-piece.

Integrally formed with the minor end of the conical member 18, is a base member 24 that bears upon the handle 12 adjacent the ear-piece 16. Projecting upwardly from the upper flat surface 26 of the base member 24, is a pair of spaced ears 28.

Projecting outwardly from one end of a substantially rectangular support 30, is an ear or tongue 32 that is pivoted between the ears 28 by a pin or the like 34.

The free end of support 30 is provided with a longitudinal recess or blind bore 36 and a fastener 38 receivably engages an internally threaded opening 40 provided in the support 30, that communicates with the recess 36.

One end 42 of an arcuate resilient head-piece or harness 44 is slidably received in the recess 36 and the end 42 is provided with spaced, threaded openings 46 for selectively receiving the fastener 38 to retain the harness 44 adjustably and removably secured to the support 30.

The head harness 44 normally overlies the hand grip 12 and the mouth piece 14 with its free end 48 disposed above the hand grip 12, as shown in Figure 2, and the support normally bears upon the surface 26 inwardly of the ears 28.

The upper surface of the support 30 adjacent its pivoted end is notched to provide an inner flat surface 50 that will bear against the surface 26 outwardly of the ears 28 when the support is moved to a position for use.

A longitudinal recess 52 is formed in the support 30 and slidably receives a locking plate or latch 54 having a detent or protuberance 56 that will engage a selected one of a pair of recesses 58 and 60 provided in the bottom wall of the recess 52 for retaining the latch 54 within the recess 52 or partially from the recess 52.

A headed pin 62 forming a hand grip is fixed to the latch 54 and is slidably received in a slot 64 provided in the support that communicates with the recess 52. The slot 64 is provided with a pair of spaced seats 66 and 68 that receive the head portion of the pin 62 to retain the latch plate in the recess 52 or partially extended therefrom.

When the head harness 44 is retained in a position for use, the support 30 is pivoted so that the surface 50 bears upon the surface 26 outwardly of the ears 28. The pin 62 is then moved so that the latch plate 54 is received in a notch 70 provided in the base member 24 and the head of the pin is received in the seat 68 and the protuberance 56 is positioned in the recess 60.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. An attachment for telephones comprising a base member having an upper flat surface, means for detachably securing the base member to a telephone, a support pivoted to said base member and overlying said base member, a head harness carried by said support, and means for locking said support in an extended position and against the upper flat surface of said base member, said first mentioned means including a split conical ear-piece embracing member of resilient material.

2. An attachment for telephones comprising a base member, a split conical ear-piece embracing member of resilient material for yieldingly retaining said base member on a telephone earpiece, a support pivoted to and overlying said base member, means carried by said support for engaging a user's head, said last mentioned means adapted to normally overlie a telephone, and means for locking the support against pivotal movement to the base member with the head engaging means extending from one end of a telephone said base member being disposed substantially perpendicular to said ear piece embracing member and having a flat upper surface, said locking means holding the support against the flat surface of said base member.

3. The combination of claim 2 wherein said last mentioned means includes a slidable latch.

4. The combination of claim 2 wherein said last mentioned means includes a slidable latch carried by said support, and a recess provided in said base member for receiving said latch.

5. An attachment for telephones comprising a resilient substantially conical member yieldingly embracing the ear-piece of a telephone and having a longitudinal slot, a base member integrally formed with said conical member and including a pair of spaced, upstanding ears, an elongated support pivoted at one end between said ears and normally overlying a telephone, a head harness removably secured to said support, a slidable latch carried by said support, and a notch provided in said base member receiving said latch to retain the support extending relative to said base member.

6. A headgear for supporting telephone instruments, said headgear comprising a split conical member of resilient material yieldingly embracing the ear-piece of a telephone, an elongated base member integrally formed with the conical member and overlying the handle portion of a telephone, said base member including an outer end portion having a notch therein, a pair of ears rising from the base member adjacent the outer end portion thereof, an elongated support having one end received between said pair of ears, a pivot pin securing said pair of ears to one end of said support, a head engaging member secured to said support, and a latch carried by said support and received in said notch to retain the support extended relative to said base member.

7. A headgear for supporting telephone instruments, said headgear comprising a split conical member of resilient material yieldingly embracing the ear-piece of a telephone, an elongated base member integrally formed with the conical member and overlying the handle portion of a telephone, said base member including an outer end portion having a notch therein, a pair of ears rising from the base member adjacent the outer end portion thereof, an elongated support having one end received between said pair of ears, a pivot pin securing said pair of ears to one end of said support, a head engaging member secured to said support, said support having a longitudinal recess therein, a latch slidably received in said recess, said recess having a bottom wall, a depression in the bottom wall of said recess, and a detent on said latch received in said depression to retain the latch partially exposed from the recess, the exposed portion of said latch adapted to enter the notch in said base member to hold the support extended from the base member.

8. A headgear for supporting telephone instruments, said headgear comprising a split conical member of resilient material yieldingly embracing the ear-piece of a telephone, an elongated base member integrally formed with the conical member and overlying the handle portion of a telephone, said base member including an outer end portion having a notch therein, a pair of ears rising from the base member adjacent the outer end portion thereof, an elongated support having one end received between said pair of ears, a pivot pin securing said pair of ears to one end of said support, a head engaging member secured to said support, said support being substantially rectangular and having first and second bearing surfaces, the first bearing surface of said support overlying and bearing against said base member inwardly of said ears to position the head engaging member over a telephone and the second bearing surface of said support overlying and bearing against said base member outwardly of said ears when the support is extended relative to the base member, a latch slidably mounted on said support and having an end portion for reception in said notch to lock the support extended relative to said base member, and means for retaining the end portion of said latch in said notch.

ALICE M. HUTCHINSON.

(References on following page)

REFERENCES CITED

The following references are of record in the file of this patent:

UNITED STATES PATENTS

| Number | Name | Date |
|---|---|---|
| 1,951,332 | Barclay | Mar. 20, 1934 |
| 2,020,084 | Sidders | Nov. 5, 1935 |
| 2,025,398 | Pocock | Dec. 24, 1935 |
| 2,360,027 | Werner | Oct. 10, 1944 |
| 2,408,720 | Alger | Oct. 8, 1946 |
| 2,486,438 | Scarlett | Nov. 1, 1949 |

FOREIGN PATENTS

| Number | Country | Date |
|---|---|---|
| 385,650 | Germany | Dec. 11, 1923 |
| 520,468 | Germany | Mar. 11, 1931 |
| 214,839 | Great Britain | May 1, 1924 |